(12) United States Patent
Hill

(10) Patent No.: US 12,151,718 B2
(45) Date of Patent: Nov. 26, 2024

(54) WELDED NOZZLE FOR A TANK CAR

(71) Applicant: Trinity Tank Car, Inc., Dallas, TX (US)

(72) Inventor: Ross E. Hill, River Oaks, TX (US)

(73) Assignee: TRINITY TANK CAR, INC., Dallas, TX (US)

( * ) Notice: Subject to any disclaimer, the term of this patent is extended or adjusted under 35 U.S.C. 154(b) by 912 days.

(21) Appl. No.: 17/150,277

(22) Filed: Jan. 15, 2021

(65) Prior Publication Data

US 2021/0221410 A1  Jul. 22, 2021

Related U.S. Application Data

(60) Provisional application No. 62/962,624, filed on Jan. 17, 2020.

(51) Int. Cl.
*B61D 5/06* (2006.01)
*B65D 90/00* (2006.01)
*F17C 13/00* (2006.01)
*B65D 88/74* (2006.01)

(52) U.S. Cl.
CPC .............. *B61D 5/08* (2013.01); *F17C 13/006* (2013.01); *B61D 5/04* (2013.01); *F17C 2201/0109* (2013.01); *F17C 2201/054* (2013.01); *F17C 2203/0391* (2013.01); *F17C 2205/0161* (2013.01); *F17C 2205/0352* (2013.01); *F17C 2223/0161* (2013.01); *F17C 2270/0173* (2013.01)

(58) Field of Classification Search
CPC ...... F17C 2201/0109; F17C 2223/0161; F17C 2201/054; F17C 2223/033; F17C 2203/0391; F17C 2203/0629; F17C 3/08; F17C 13/005; F17C 13/001; F17C 2205/0352; F17C 2221/011; F17C 2221/012; F17C 2221/014; F17C 2221/033; F17C 2270/0173; B61D 5/06; B61D 5/04; B61D 5/08; B61D 5/02
See application file for complete search history.

(56) References Cited

U.S. PATENT DOCUMENTS 2,767,962 A * 10/1956 Blackburn ............ B65D 90/022
                                                  220/592.12
3,078,004 A *  2/1963 Randolph .............. B61D 5/008
                                                  280/832
3,326,141 A *  6/1967 Graves ..................... B61D 5/04
                                                  280/832

(Continued)

OTHER PUBLICATIONS

Office Action issued by the Canadian Intellectual Property Office for Application No. 3,105,831—Mar. 12, 2024.

*Primary Examiner* — Zachary L Kuhfuss
*Assistant Examiner* — Cheng Lin
(74) *Attorney, Agent, or Firm* — Baker Botts L.L.P.

(57) ABSTRACT

A tank for a railway tank car includes an outer tank, a nozzle, a fittings plate, and a set of pipes. The nozzle protrudes through the outer tank such that an outer edge of the nozzle extends past an exterior surface of the outer tank. An intersection between the nozzle and the outer tank defines an opening in the outer tank. The fittings plate is welded to the nozzle around the outer edge of the nozzle. The set of pipes pass through the fittings plate and into the outer tank through the nozzle. The set of pipes includes pipes to load and/or unload fluid from the tank.

17 Claims, 6 Drawing Sheets

(56) References Cited

U.S. PATENT DOCUMENTS

| | | | | |
|---|---|---|---|---|
| 3,602,003 | A | * | 8/1971 | Hampton .............. F17C 13/005<br>220/592.2 |
| 3,698,200 | A | * | 10/1972 | Johnson ................... F17C 3/08<br>220/592.27 |
| 4,579,249 | A | * | 4/1986 | Patterson ................. B60P 3/22<br>220/560.12 |
| 4,960,222 | A | * | 10/1990 | Fields, III .............. B65D 90/24<br>220/571 |
| 8,403,000 | B2 | * | 3/2013 | Adkins ................... F17C 13/00<br>62/50.1 |
| 2008/0209917 | A1 | * | 9/2008 | Adler ....................... F17C 3/00<br>137/511 |

* cited by examiner

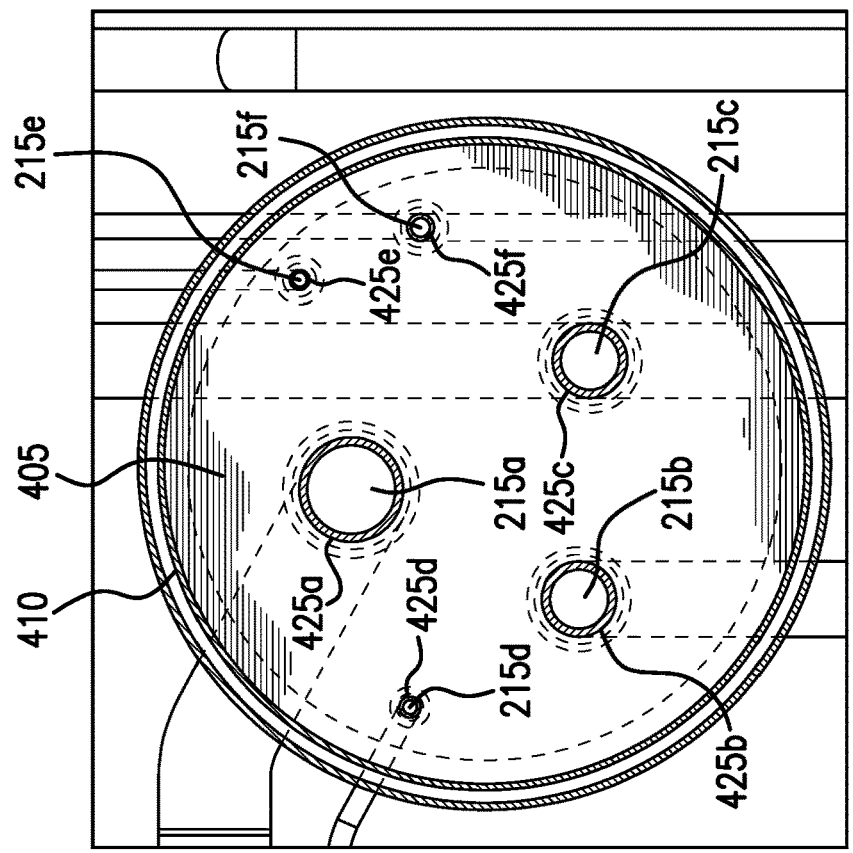
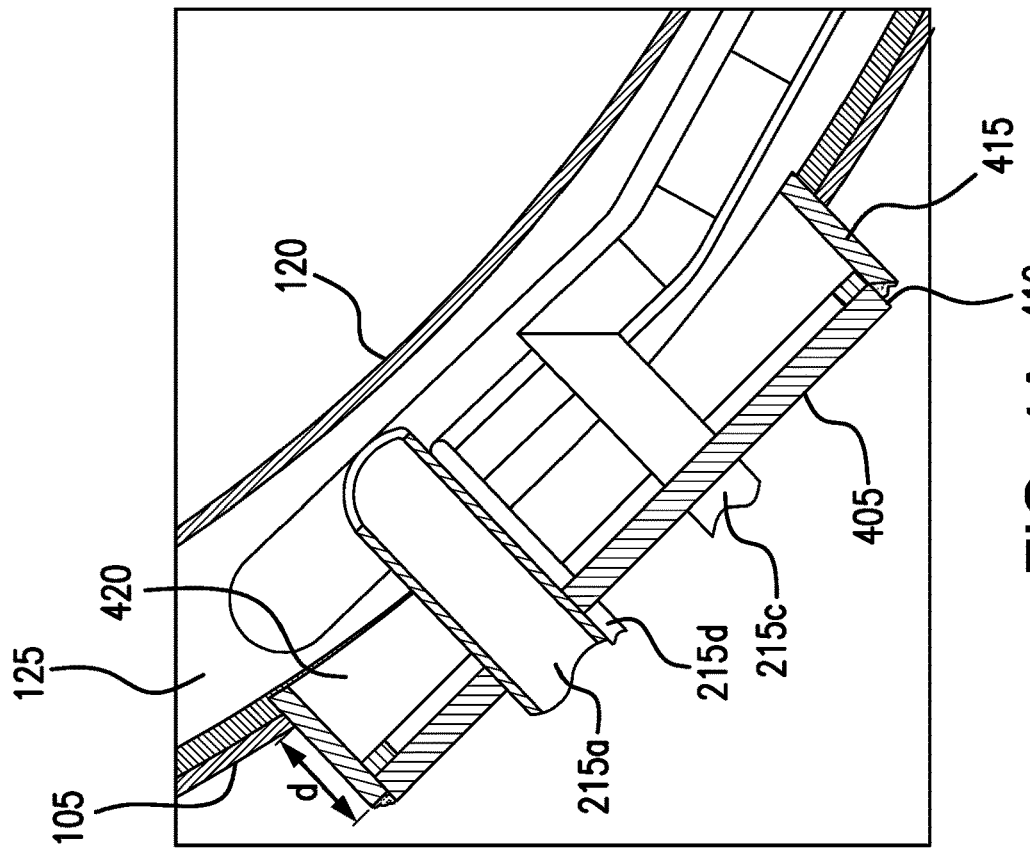
FIG. 4A
FIG. 4B

WELDED NOZZLE FOR A TANK CAR

RELATED APPLICATIONS

This application claims priority to U.S. Provisional Application Ser. No. 62/962,624 entitled "WELDED NOZZLE FOR A TANK CAR," filed Jan. 17, 2020, the entire content of which is incorporated herein by reference.

TECHNICAL FIELD OF THE INVENTION

This disclosure relates generally to railcars, and more particularly to a welded nozzle for a cryogenic tank car constructed using a tank within a tank design.

BACKGROUND

Railroad tank cars are used to transport a variety of fluid commodities over large distances. While traditional tank cars typically include a tank wrapped in insulation and covered in a protective jacket, specialized tank cars also exist. For example, cryogenic tank cars have been designed to transport cryogenic liquids (e.g., liquid nitrogen, liquid hydrogen, liquid oxygen, liquid methane, etc.). Such tank cars typically include an inner tank positioned within an outer tank. A vacuum is applied to the annular space between the two tanks to provide insulation to the commodity transported within the inner tank.

SUMMARY

According to an embodiment, a tank for a railway tank car includes an outer tank, a nozzle, a fittings plate, and a set of pipes. The nozzle protrudes through the outer tank such that an outer edge of the nozzle extends past an exterior surface of the outer tank. An intersection between the nozzle and the outer tank defines an opening in the outer tank. The fittings plate is welded to the nozzle around the outer edge of the nozzle. The set of pipes pass through the fittings plate and into the outer tank through the nozzle. The set of pipes includes pipes to load and/or unload fluid from the tank.

According to another embodiment, a method for manufacturing a tank for a railway tank car includes coupling a nozzle to an outer tank. The nozzle is configured to protrude through the outer tank, such that an outer edge of the nozzle extends past an exterior surface of the outer tank. An intersection between the nozzle and the outer tank defines an opening in the outer tank. The method also includes passing a set of pipes through the nozzle. The set of pipes includes pipes to load and/or unload fluid from the tank. The method additionally includes placing a fittings plate over the outer edge of the nozzle. The fittings plate defines a set of openings. Each opening of the set of openings is associated with a pipe of the set of pipes. Placing the fittings plate over the outer edge of the nozzle includes passing each pipe of the set of pipes through the associated opening of the set of openings. The method further includes welding the fittings plate to the nozzle around the outer edge of the nozzle.

According to a further embodiment, a railway tank car includes an outer tank, a nozzle, a fittings plate, a set of pipes, and a set of wheel assemblies. The nozzle protrudes through the outer tank, such that an outer edge of the nozzle extends past an exterior surface of the outer tank. An intersection between the nozzle and the outer tank defines an opening in the outer tank. The fittings plate is welded to the nozzle around the outer edge of the nozzle. The set of pipes pass through the fittings plate and into the outer tank through the nozzle. The set of pipes includes pipes to load and/or unload fluid from the tank. The outer tank is coupled to the set of wheel assemblies.

Certain embodiments of the welded nozzle may provide one or more technical advantages. For example, an embodiment may prevent virtual leaks from developing and reducing the vacuum present in a cryogenic tank car that has been constructed as a tank within a tank. As another example, an embodiment may enable cryogenic liquids to be transported long distances by rail. As another example, an embodiment may facilitate straightforward discovery of leaks that are acting to reduce the vacuum present in a cryogenic tank car. As a further example, an embodiment may reduce the cost and/or weight of conventional cryogenic tank cars by reducing the number of parts used to manufacture the cars. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 4A and 4B illustrate an example nozzle and welded fittings plate of the present disclosure, for use with the cryogenic tank car of FIG. 1;

DETAILED DESCRIPTION

Figure 1:
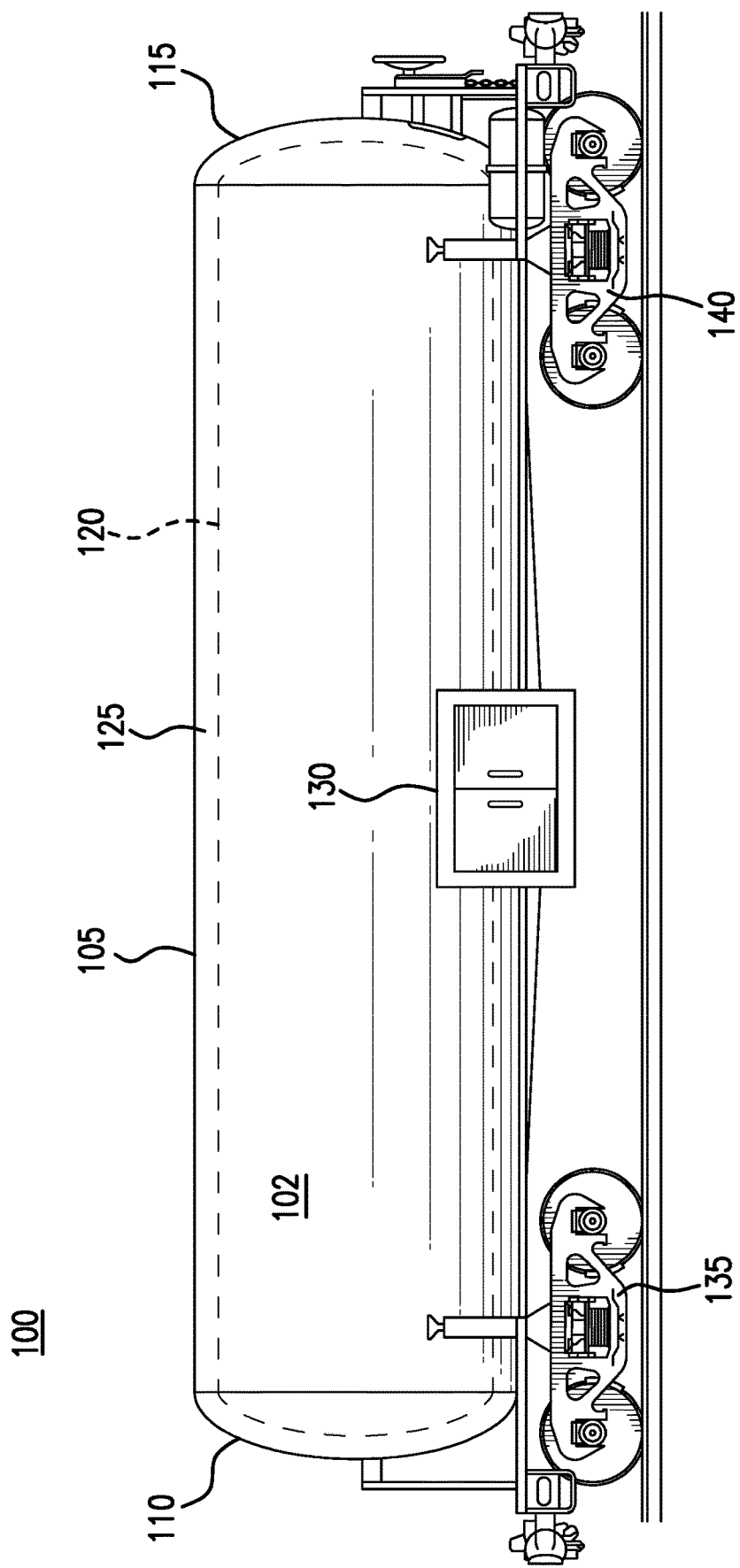
FIG. 1 illustrates an example cryogenic tank car.

Railway tank cars are used to transport a variety of fluid commodities over large distances. Traditional tank cars typically include a metal tank, wrapped in an insulating material, and covered in a protective outer jacket. Such traditional tank cars may be suitable for transporting liquids such as oil or ethanol. However, when the commodity to be transported within the tank car is a cryogenic liquid (e.g., liquid nitrogen, liquid hydrogen, liquid oxygen, liquid methane, etc.), the insulation offered by a traditional car may not be sufficient to maintain the commodity at the low temperatures characteristic of such liquids. Accordingly, cryogenic tank cars have been designed to transport these commodities. Such tank cars typically include a thin inner tank positioned within a thicker outer tank. A vacuum applied to the annular space between the two tanks is used to provide a high degree of insulation to the commodity held within the inner tank, enabling the tank car to haul extremely low temperature commodities over large distances, while helping to minimize heat leakage into the inner tank.

Commodity is typically loaded/unloaded into/from tank cars through inlet/outlet valves and pipes that penetrate the tanks. In traditional tank cars, commodity tends to be loaded/unloaded from the top and/or bottom of the tanks. In particular, nozzles are typically provided at the tops of the tank cars, providing locations for piping to enter into the tanks and to connect to valves that are serviceable from the outside of the tanks. Thick steel fittings plates, designed to cover such nozzles, provide mounting locations for these valves as well as various other fittings. Such fittings plates are typically fastened onto the nozzles using a set of mechanical fasteners, with annular gaskets fitted between the nozzles and the fittings plates, to help seal the interiors of the tanks from the external environment.

In contrast to a traditional tank car, in which commodity tends to be loaded/unloaded from the top and/or bottom of the tank, a cryogenic tank car constructed using the tank within a tank design, described above, typically includes a cabinet on the side of the tank, which houses the valves and pipes that are used to load/unload the tank. This allows an operator to load/unload the tank car while standing next to the tank. Within the cabinet, a large reinforcement pad is typically welded to the outer tank. A set of pipes, each associated with its own individual fittings pad that is coupled to the outside of the reinforcement pad, penetrate the tank at separate locations, through the reinforcement pad. Accordingly, the reinforcement pad is welded not only around the outer edge of the pad, but also around the holes cut into the pad, through which the individual pipes pass.

Undesirably, such a configuration creates the potential for a partial loss of vacuum in the annular space between the inner tank and the outer tank. In particular, during the welding process, air may become trapped underneath the reinforcement pad, between the area defined by the weld around the outer edge of the pad and the welds around the holes cut into the pad. Even if the weld around the outer edge of the reinforcement pad provides a good seal, a crack in any of the welds around the holes cut into the pad may allow air trapped between the pad and the outer tank to enter the annular space between the outer tank and the inner tank. The loss of vacuum resulting from such a virtual leak may be sufficient to reduce the insulation provided by the vacuum below the range of values suitable for use when transporting cryogenic liquids.

This disclosure contemplates a welded nozzle, for use in a cryogenic tank car, that addresses one or more of the above issues. In contrast to a conventional tank within a tank design, in which piping protrudes from the outer tank through a plurality of individual pads welded directly onto a large reinforcement pad that is welded to the outer tank, this disclosure contemplates the use, in certain embodiments, of one large nozzle, with a fittings plate welded onto the nozzle, through which all of the pipes pass. The use of a single weld, around the outside of the fittings plate, helps to prevent virtual leaks from developing and reducing the vacuum in the annular space between the inner and the outer tanks. Furthermore, welding the fittings plate to the nozzle (rather than mechanically fastening the plate to the nozzle), helps to maintain the vacuum between the inner and the outer tanks, while also enabling straightforward discovery of any actual leaks into the vacuum space that may develop.

Embodiments of the present disclosure and its advantages are best understood by referring to FIGS. 1 through 6 of the drawings, like numerals being used for like and corresponding parts of the various drawings. Additional information is disclosed in U.S. patent application Ser. No. 17/150,198 entitled, "Internal Nozzle for a Tank Car"; and U.S. patent application Ser. No. 17/150,353 entitled, "Manway Relief for a Tank Car", which are both hereby incorporated by reference herein as if reproduced in their entirety. A railroad tank car is used throughout this disclosure as an example, but the ideas presented herein may apply to other cryogenic liquid storage tanks, including storage tanks for use on other types of vehicles or vessels.

FIG. 1 illustrates an example cryogenic tank car 100 onto which the welded fittings plate of the present disclosure may be installed. Cryogenic tank car 100 includes storage tank 102 mounted on wheel assemblies 135 and 140. Storage tank 102 is generally configured to store a cryogenic liquid, such as methane, nitrogen, hydrogen, oxygen, and/or any other liquefied gas. Storage tank 102 includes a generally elongated hollow cylinder, enclosed at a first end by tank head 110 and at a second end by tank head 115. This disclosure contemplates that storage tank 102 may be of any suitable diameter and length.

As illustrated in FIG. 1, storage tank 102 may be a dual-walled cryogenic tank equipped with a vacuum jacket. For example, storage tank 102 may include outer tank 105 and inner tank 120 positioned within outer tank 105. Outer tank 105 and inner tank 120 may be formed from any suitable material or combination of materials. For example, outer tank 105 and inner tank 120 may be formed from steel, or any other suitable metal. In some embodiments, outer tank 105 may be formed from a different material than inner tank 120. In certain embodiments, the thickness of outer tank 105 is greater than the thickness of inner tank 120.

The exterior surface of inner tank 120 and the interior surface of outer tank 105 define annular space 125. Annular space 125 may be configured to hold a vacuum. For example, annular space 125 may be sealed off from the exterior of outer tank 105 and the interior of inner tank 120, such that air from the exterior of outer tank 105 and/or fluid from the interior of inner tank 120 may not enter annular space 125. A vacuum may be established in annular space 125 using one or more vacuum pumps, or any other suitable means. Once the vacuum is established, it may be used to provide insulation to the contents of inner tank 120, by minimizing the transfer of heat from outer tank 105 to inner tank 120.

Storage tank 102 may include piping circuits to load/unload commodity into/out of storage tank 102. For example, storage tank 102 may include a spray header, a sparger, a vent circuit, a fill and drain circuit, any other piping circuit, any other suitable component, and/or any number and combination of the preceding. Valves and/or fittings may be mounted on storage tank 102, to control the loading and unloading of commodities to and from storage tank 102. Such valves and/or fittings may be mounted at any location on storage tank 102. As an example, in certain embodiments, the valves and/or fittings may be mounted on the top and/or bottom of storage tank 102. As another example, in certain embodiments of cryogenic storage tanks 102, the valves and/or fittings may be mounted on a side of storage tank 102 and housed inside cabinet 130. As a further example, in certain embodiments of cryogenic storage tank 102, the valves and/or fittings may be mounted on one or both of tank heads 110 and 115.

Figure 2:
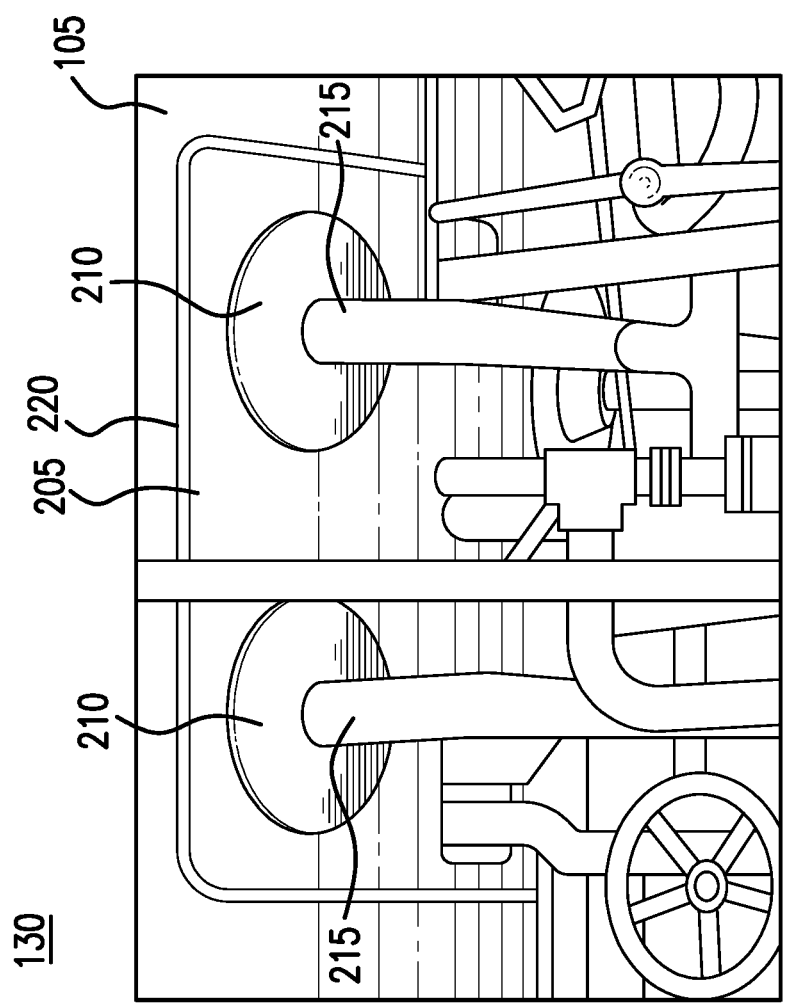
FIG. 2 illustrates example conventional system for use with the cryogenic tank car of FIG. 1, in which piping protrudes from the outer tank of the tank car through a plurality of individual pads welded directly onto a large reinforcement pad that is itself welded to the outer tank.

FIG. 2 presents an example illustrating portions of the interior of cabinet 130, that may be present in conventional cryogenic tank cars. As described above, cabinet 130 typically includes valves, fittings, and/or pipes used to control the loading and/or unloading of storage tank 102. One or more cabinets 130 may be mounted on the side of tank car 100 and/or on one or both of tank heads 110 and 115. Such positioning of cabinet 130 enables an operator to load/unload storage tank 120 while standing next to the tank.

As illustrated in FIG. 2, conventional cryogenic tank car cabinets 130 typically include a large reinforcement pad 205 that is welded to outer tank 105. Reinforcement pad 205 is typically formed from carbon steel. One or more pipes 215 penetrate reinforcement pad 205, and are used to load/unload commodity to/from inner tank 120. Each pipe 215 is associated with its own individual fittings pad 210, which is welded to reinforcement pad 205. Fittings pads 210 are typically formed from stainless steel, and cover holes into both reinforcement pad 205 and outer tank 105, through which the individual pipes 215 pass. Accordingly, reinforcement pad 205 is welded not only around outer edge 220 of reinforcement pad 205, but also around the holes cut into the pad. During normal operating conditions, the welds around reinforcement pad 205 and fittings pads 210 are configured to seal outer tank 105, enabling the establishment of a vacuum in annular space 125 between inner tank 120 and outer tank 105. As described above such a vacuum may be used to provide sufficient insulation to inner tank 120, such that cryogenic fluids may be transported within inner tank 120. However, cracks in any of the above-described welds may lead to a real and/or virtual leak of atmosphere into annular space 125, reducing the insulation offered by the vacuum.

Figure 3:
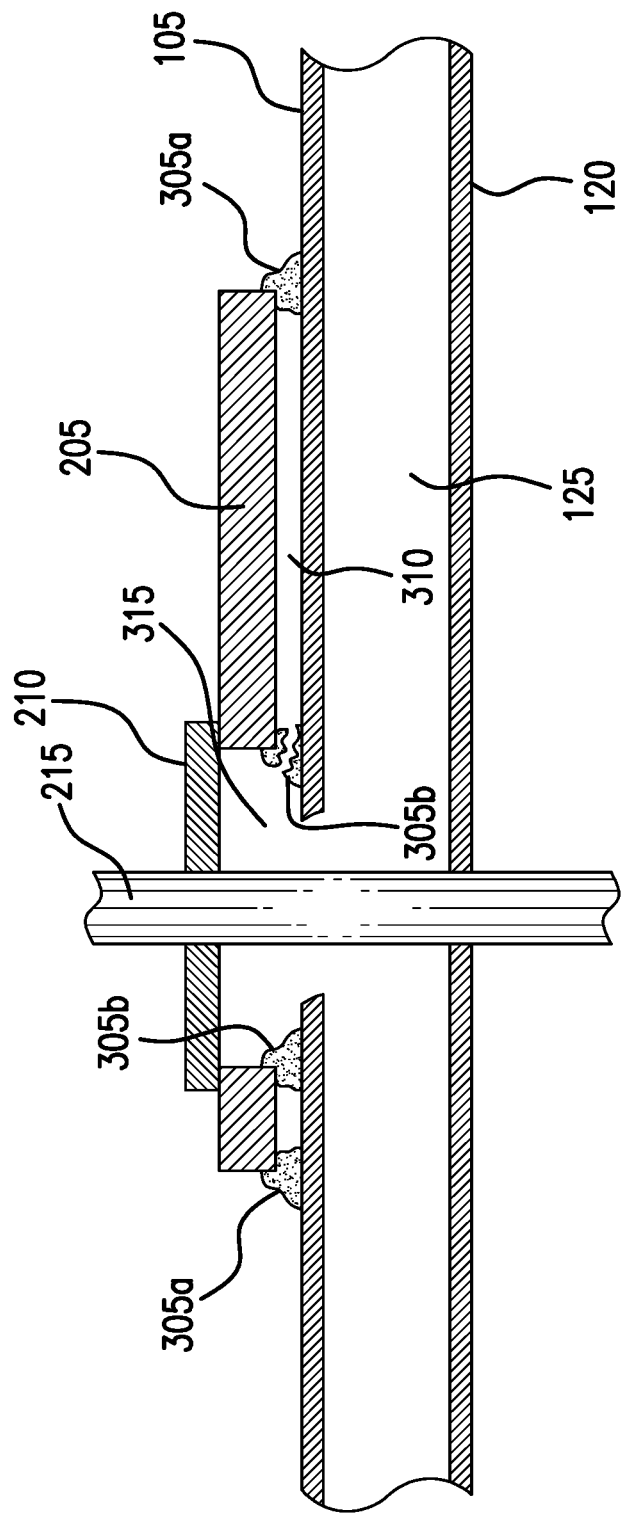
FIG. 3 illustrates an example virtual leak that may develop in the conventional system of FIG. 2.

FIG. 3 illustrates an example in which the multiple welds around reinforcement pad 205 may lead to the development of a virtual leak of atmosphere into annular space 125 between inner tank 120 and outer tank 105. FIG. 3 presents a cross-section of reinforcement pad 205, welded onto outer tank 105. Hole 315 has been cut into reinforcement pad 205 to accommodate the passage of pipe 215 into outer tank 105. Fittings plate 210 is welded to reinforcement pad 205 and covers hole 315. As illustrated in FIG. 3, during the welding process, air 310 may become trapped underneath reinforcement pad 205, between the area defined by the weld 305a around the outer edge of the pad and the weld 305b around hole 315 cut into pad 205 to accommodate pipe 215. Even if weld 305a, around the outer edge of reinforcement pad 205, provides a good seal (such that atmosphere is unable to pass through weld 305a), a crack in weld 305b, around hole 315 (as illustrated in FIG. 3), may allow air 310 trapped between pad 205 and outer tank 105 to enter annular space 125 between outer tank 105 and inner tank 120. The loss of vacuum within annular space 125 resulting from such a virtual leak may be sufficient to reduce the insulation provided by the vacuum below the range of values suitable for use when transporting cryogenic liquids. For example, the addition of only 500 milliliters of atmosphere to an annular space of volume ~35,000 L may be sufficient to reduce the insulation provided by the vacuum in the annular space below the range of values suitable for use when transporting cryogenic liquids.

The multiple welds 305 around reinforcement pad 205 also make it difficult to discover the source(s) of any virtual leaks. For example, as illustrated in FIG. 3, each fittings plate 210, welded on top of reinforcement pad 205 to cover hole 315, also covers weld 305b around hole 315. As a result, if a crack develops in weld 305b, such crack will be undetectable by mere visual inspection of outer tank 105 (including visual inspection of reinforcement pad 205 and fittings plate 210). Rather, identification of crack 305b as the source of a virtual lead may require removal of fittings plate 210 from reinforcement pad 205.

FIGS. 4A and 4B illustrate an example of the nozzle and welded fittings plate of the present disclosure, for use with cryogenic tank car 100. FIG. 4A presents a cross-section of welded fittings plate 405 and nozzle 415, while FIG. 4B presents a face-on view of welded fittings plate 405.

As illustrated in FIGS. 4A and 4B, in contrast to a conventional tank within a tank design, in which piping 215 protrudes from outer tank 105 through a plurality of individual pads 210 welded directly onto a large reinforcement pad 205 that is welded to outer tank 105, this disclosure contemplates the use of one large nozzle 415, with fittings plate 405 welded onto nozzle 405, through which all of the pipes 215a through 215g pass. Nozzle 415 may be formed from a hollow, cylindrical pipe (or any other suitable elongated, hollow structure), and defines a hole/opening 420 in outer tank 105. Nozzle 415 extends from outer tank 105 in a direction generally opposite the direction from outer tank 105 towards inner tank 120, such that a first edge of nozzle 415 is coupled to outer tank 105 (and/or is located within annular space 125), and a second edge of nozzle 415 is located a distance d from an external surface of outer tank 105. This disclosure contemplates that distance d may be any suitable distance. In certain embodiments, the first edge of nozzle 415 may be flush with first tank 105, such that the first edge does not extend into annular space 125. In some embodiments, the first end of nozzle 415 may extend somewhat into annular space 125, such that the first edge of nozzle 415 is located within annular space 125. In such embodiments, nozzle 415 may be coupled to outer tank 105 along a side of nozzle 415 near the first edge. For example, nozzle 415 may be welded or otherwise coupled to outer tank 105 around hole/opening 410. A cross-section of nozzle 415 may be circular, elliptical, or any other suitable shape. Nozzle 415 may be formed from the same material as outer tank 105, or any other suitable material. For example, in certain embodiments, nozzle 415 may be formed from steel or any other suitable metal.

Fittings plate 405 is configured to rest on top of the second edge of nozzle 415, and to cover the opening 420 into outer tank 105 defined by nozzle 415. For example, fittings plate may generally be of the same shape as the cross-section of nozzle 415. Fittings plate 415 may be formed from the same material as outer tank 105 and/or nozzle 415, or any other suitable material. For example, in certain embodiments, fittings plate 405 may be formed from steel or any other suitable metal. This disclosure contemplates that fittings plate 405 may be of any suitable thickness. For example, in certain embodiments, fittings plate 405 may be the same thickness as outer tank 105, thicker than outer tank 105, or thinner than outer tank 105. In certain embodiments, the second edge of nozzle 415 may include a groove into which fittings plate 405 is configured to sit.

Fittings plate 405 is secured to the second edge of nozzle 415 by a weld around the outer edge 410 of fittings plate 405. The use of a single weld, around outer edge 410 of fittings plate 405, helps to prevent virtual leaks from developing and reducing the vacuum in annular space 125 between outer tank 105 and inner tank 120. Furthermore, welding fittings plate 405 to nozzle 415 (rather than mechanically fastening plate 405 to nozzle 415) may help to maintain the vacuum within annular space 125, while also enabling straightforward discovery of any leaks into annular space 125 that may develop.

This disclosure contemplates that fittings plate 405 may accommodate any number of pipes 215a through 215f passing from the external environment of outer tank 105 into annular space 125, and ultimately inner tank 120. Such piping 215a through 215f may extend through holes 425a through 425f in fittings plate 405. To help prevent leaks from developing into annular space 125 through such holes, piping 215a through 215f may be welded to fittings plate 405, around holes 425a through 425f. For example, pipe 215a may be welded to fittings plate 405 around an outer circumference of pipe 215a at the location where pipe 215a passes through hole 425a, pipe 215b may be welded to fittings plate 405 around an outer circumference of pipe 215b at the location where pipe 215b passes through hole 425b, etc. Similar to the weld around outer edge 410 of fittings plate 405, such welds between piping 215a through 215f and fittings plate 405 may help to maintain the vacuum within annular space 125, while also enabling straightforward discovery of any leaks into annular space 125 that may develop.

Figure 5:
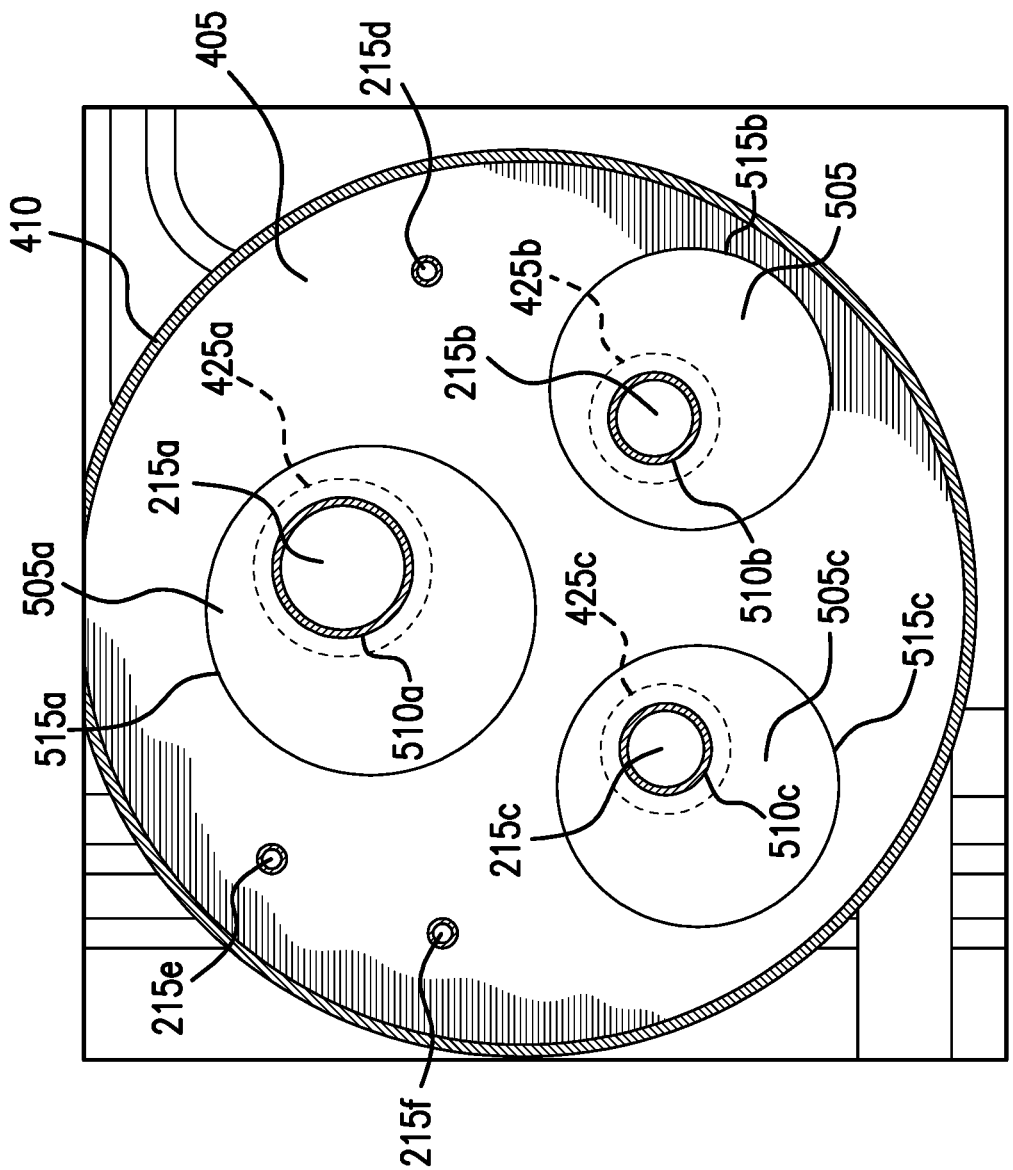
FIG. 5 illustrates an example of the nozzle and welded fittings plate of FIGS. 4A and 4B, in which a set of cover plates are attached to the welded fittings plate.

In certain embodiments, and as illustrated in FIGS. 4A and 4B, holes 425a through 425f are designed to provide a small clearance for the passage of the corresponding piping 215a through 215f. In this manner, welds around piping 215a through 215f may be used to provide seals around holes 425a through 425e. In some embodiments, one or more of holes 425a through 425f may be designed to provide a larger clearance for the passage of the corresponding piping 215a through 215f This may be desirable, to provide a tolerance for manufacturing purposes. FIG. 5 illustrates an example of one such embodiment.

As illustrated in FIG. 5, holes 425a through 425c in fittings plate 405 may be designed to provide a significant clearance for the corresponding piping 215a through 215c. For example, the diameter of one or more of holes 425a through 425c may be half an inch or more larger than the diameter of the corresponding piping 215a through 215c that passes through the hole. In such embodiments, it may not be possible to use welds to seal the exposed space between the perimeter of each hole and the piping that passes through the hole. Accordingly, in certain embodiments, cover plates 505a through 505c may be installed on fittings plate 405. As illustrated in FIG. 5, each cover plate includes a hole designed to accommodate piping. For example, cover plate 505a includes hole 510a to accommodate piping 215a, cover plate 505b includes hole 510b to accommodate piping 215b, and cover plate 505c includes hole 510c to accommodate piping 215c. Each cover plate 505a through 505c may be used to cover the opening left exposed by the corresponding oversized hole 425a through 425c. For example, cover plate 505a may be used to cover the opening into outer tank 105 that is left exposed by hole 425a, cover plate 505b may be used to cover the opening into outer tank 105 that is left exposed by hole 425b, and cover plate 505c may be used to cover the opening into outer tank 105 that is left exposed by hole 425c. In order to accomplish this purpose, each hole 510a through 510c in cover plates 505a through 505c is designed to provide a smaller clearance for piping 215a through 215c than the corresponding hole 425a through 425c in fittings plate 405. For example, in certain embodiments holes 425a through 425c and holes 510a through 510c may be circular. In such embodiments, a diameter of each of holes 510a through 510c is smaller than the diameter of the correspond hole of holes 425a through 425c. Cover plates 505a through 505c may be welded to fittings plate 405 around their outer perimeters 515a through 515c. Additionally, cover plates 505a through 505c may be welded to the corresponding piping 215a through 215c around the perimeter of holes 510a through 510c. Unlike conventional fittings pads 210 (described above in the discussion of FIG. 3), cover plates 505a through 505c are not designed to cover any welds. Accordingly, the use of cover plates 505a through 505c does not bring with it the risk of virtual leaks.

Cover plates 505a through 505c may be any suitable geometry. As an example, and as illustrated in FIG. 5, cover plates 505a through 505c may be circular in shape. As another example, cover plates 505a through 505c may be elliptical, or any other suitable shape. Holes 510a through 510c may be positioned at any location on cover plates 505a through 505c. As an example, in certain embodiments, one or more of holes 510a through 510c may be located at the center of the corresponding cover plate 505a through 505c. As another example, and as illustrated in FIG. 5, each hole 510a through 510c may be located at a position somewhat offset from the center of the corresponding cover plate 505a through 505c. This may be desirable to help ensure that a given cover plate of cover plates 505a through 505c does not interfere with any of the other cover plates and/or holes 425a through 425f in fittings plate 405.

This disclosure contemplates that any number of cover plates 425a through 425c may be installed on fittings plate 405. For example, as illustrated in FIG. 5, in certain embodiments, cover plates 505a through 505c may be used for the larger piping 215a through 215c that passes through fittings plate 405, but not for the smaller piping 215d through 215f. This may be desirable where the flexibility of the smaller piping is such that the smaller piping can easily accommodate for manufacturing tolerances.

Fittings plate 405 may additionally include any number of valves and/or other fittings used to control the flow of fluid into/out of inner tank 120 through pipes 215. Furthermore, this disclosure contemplates that any number of fittings plates 405 may be installed on a given storage tank 102, and that fittings plates 405 may be installed at any suitable locations on storage tank 102. For example, a pair of fittings plates 405 may be installed on either side of storage tank 102.

Figure 6:
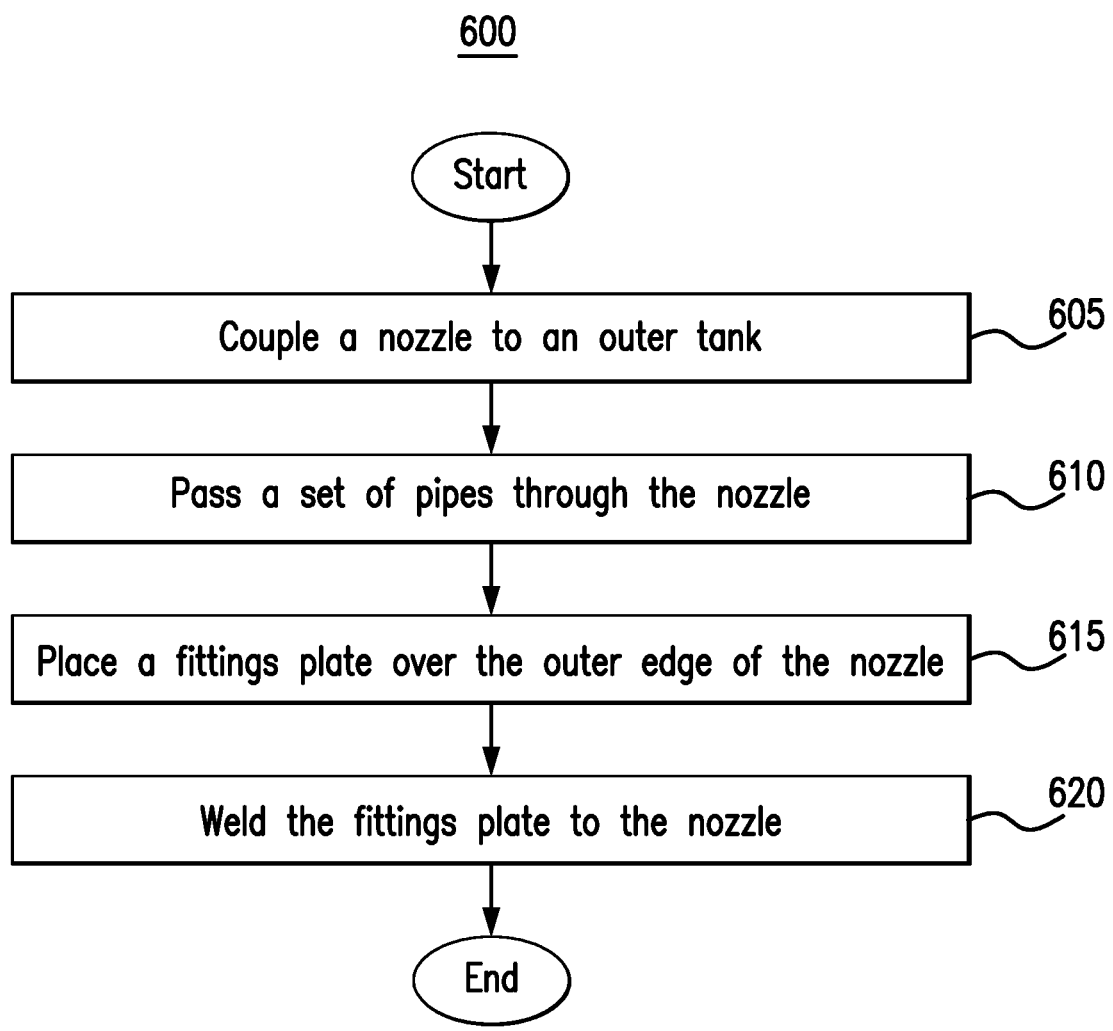
FIG. 6 presents a flow chart illustrating an example method by which a cryogenic tank car that includes the welded fittings plate of FIGS. 4A and 4B may be manufactured.

FIG. 6 presents a flow chart illustrating an example method 600 by which a cryogenic tank car 100 that includes welded fittings plate 405 may be manufactured. In step 605 nozzle 415 is coupled to outer tank 105. In certain embodiments, nozzle 415 is manufactured separately from outer tank 105. For example, nozzle 415 may be formed from a hollow metal cylinder. In such embodiments, coupling nozzle 415 is outer tank 105 may include creating opening 420 in outer tank 105 and welding nozzle 415 to outer tank 105 around the perimeter of opening 420. In some embodiments, outer tank 105 may be manufactured to include nozzle 415 (e.g., outer tank 105 and nozzle 415 may be integrally manufactured together).

In step 610, piping 215a through 215f is passed through nozzle 415. In step 615, each pipe of piping 215a through 215f is passed through a corresponding hole of holes 425a through 425f in fittings plate 405, and fittings plate 405 is placed on top of nozzle 415. In certain embodiments, placing fittings plate 415 on top of nozzle 415 may include resting fittings plate 415 in a groove on the upper edge of nozzle 415. In step 620 fittings plate 415 is welded to nozzle 415 around the upper edge of nozzle 415. In certain embodiments, fittings plate 415 is also welded around the perimeters of one or more holes 425a through 425f. In some embodiments, one or more cover plates 505a through 505c are positioned over holes 425a through 425c in fittings plate 415. Cover plates 505a through 505c are then welded to fittings plate 415 around their outer perimeters 515a through 515c. Cover plates 505a through 505c may also be welded to piping 215a through 215c, around the perimeters of the corresponding holes 510a through 510c through which the piping passes.

Modifications, additions, or omissions may be made to method 600 depicted in FIG. 6. Method 600 may include more, fewer, or other steps. For example, steps may be performed in parallel or in any suitable order. One or more steps may be performed by an individual, a machine, any other device, or a combination of the preceding.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A tank for a railway tank car comprising:
   an outer tank;
   a nozzle protruding through the outer tank, wherein:
      an outer edge of the nozzle extends past an exterior surface of the outer tank; and
      an intersection between the nozzle and the outer tank defines an opening in the outer tank;
   a fittings plate welded to the nozzle around the outer edge of the nozzle;
   a set of pipes passing through the fittings plate and into the outer tank through the nozzle, the set of pipes comprising at least one of pipes to load fluid into the tank and pipes to unload fluid from the tank;
   a cover plate, wherein:
      the fittings plate defines a set of openings, each opening of the fittings plate associated with a pipe of the set of pipes that passes through the opening;
      the cover plate defines a hole, wherein:
         a pipe of the set of pipes passes through the hole; and
         a diameter of the opening of the set of openings through which the pipe passes is larger than a diameter of the hole; and
      the cover plate is welded to the fittings plate around an outer perimeter of the cover plate.

2. The tank of claim 1, further comprising an inner tank positioned within the outer tank, the inner tank configured to store a cryogenic fluid, wherein an annular space defined by an interior surface of the outer tank and an exterior surface of the inner tank is configured to hold a vacuum.

3. The tank of claim 2, wherein each pipe of the set of pipes travels at least a distance in the annular space between the inner tank and the outer tank, in a direction that is not substantially perpendicular to a surface of the inner tank through which the pipe enters.

4. The tank of claim 1, wherein the nozzle is positioned on a side of the outer tank.

5. The tank of claim 1, further comprising:
   a second nozzle protruding through the outer tank, wherein an outer edge of the second nozzle extends past the exterior surface of the outer tank;
   a second fittings plate welded to the second nozzle around the outer edge of the second nozzle; and
   a second set of pipes passing through the second fittings plate and into the outer tank through the second nozzle, the second set of pipes comprising at least one of pipes to load fluid into the railway tank car and pipes to unload fluid from the railway tank car.

6. The tank of claim 1, wherein a center of the hole is offset from a center of the cover plate.

7. A method for manufacturing a tank for a railway tank car comprising:
   coupling a nozzle to an outer tank, wherein:
      the nozzle is configured to protrude through the outer tank, such that an outer edge of the nozzle extends past an exterior surface of the outer tank; and
      an intersection between the nozzle and the outer tank defines an opening in the outer tank;
   passing a set of pipes through the nozzle, the set of pipes comprising at least one of pipes to load fluid into the tank and pipes to unload fluid from the tank;
   placing a fittings plate over the outer edge of the nozzle, the fittings plate defining a set of openings, each opening of the set of openings associated with a pipe of the set of pipes, wherein placing the fittings plate over the outer edge of the nozzle comprises passing each pipe of the set of pipes through the associated opening of the set of openings;
   welding the fittings plate to the nozzle around the outer edge of the nozzle;
   placing a cover plate on the fittings plate, the cover plate defining a hole, wherein:
      placing the cover plate on the fittings plate comprises passing a pipe of the set of pipes through the hole; and
      a diameter of the opening of the set of openings that is associated with the pipe is larger than a diameter of the hole; and
   welding the cover plate to the fittings plate around an outer perimeter of the cover plate.

8. The method of claim 7, wherein:
   the outer tank encloses an inner tank that is configured to store a cryogenic fluid; and
   an annular space defined by an interior surface of the outer tank and an exterior surface of the inner tank is configured to hold a vacuum.

9. The method of claim 8, wherein each pipe of the set of pipes travels at least a distance in the annular space between the inner tank and the outer tank, in a direction that is not substantially perpendicular to a surface of the inner tank through which the pipe enters.

10. The method of claim 7, wherein coupling the nozzle to the outer tank comprises coupling the nozzle to a side of the outer tank.

11. The method of claim 7, further comprising:
   coupling a second nozzle to the outer tank, wherein:
      the second nozzle is configured to protrude through the outer tank, such that an outer edge of the second nozzle extends past an exterior surface of the outer tank; and
      an intersection between the second nozzle and the outer tank defines a second opening in the outer tank;
   passing a second set of pipes through the second nozzle, the second set of pipes comprising at least one of pipes to load fluid into the tank and pipes to unload fluid from the tank;
   placing a second fittings plate over the outer edge of the second nozzle, the second fittings plate defining a second set of openings, each opening associated with a pipe of the second set of pipes, wherein placing the second fittings plate over the outer edge of the second nozzle comprises passing each pipe of the second set of pipes through the associated opening of the second set of openings; and
   welding the second fittings plate to the second nozzle around the outer edge of the second nozzle.

12. The method of claim 7, wherein a center of the hole is offset from a center of the cover plate.

13. A railway tank car comprising:
an outer tank;
a nozzle protruding through the outer tank, wherein:
  an outer edge of the nozzle extends past an exterior surface of the outer tank; and
  an intersection between the nozzle and the outer tank defines an opening in the outer tank;
a fittings plate welded to the nozzle around the outer edge of the nozzle;
a set of pipes passing through the fittings plate and into the outer tank through the nozzle, the set of pipes comprising at least one of pipes to load fluid into the tank and pipes to unload fluid from the tank;
a set of wheel assemblies, wherein the outer tank is coupled to the set of wheel assemblies;
a cover plate, wherein:
  the fittings plate defines a set of openings, each opening of the fittings plate associated with a pipe of the set of pipes that passes through the opening;
  the cover plate defines a hole, wherein:
    a pipe of the set of pipes passes through the hole; and
    a diameter of the opening of the set of openings through which the pipe passes is larger than a diameter of the hole; and
  the cover plate is welded to the fittings plate around an outer perimeter of the cover plate.

14. The railway tank car of claim 13, further comprising an inner tank positioned within the outer tank, the inner tank configured to store a cryogenic fluid, wherein an annular space defined by an interior surface of the outer tank and an exterior surface of the inner tank is configured to hold a vacuum.

15. The railway tank car of claim 14, wherein each pipe of the set of pipes travels at least a distance in the annular space between the inner tank and the outer tank, in a direction that is not substantially perpendicular to a surface of the inner tank through which the pipe enters.

16. The railway tank car of claim 13, wherein the nozzle is positioned on a side of the outer tank.

17. The tank of claim 13, wherein a center of the hole is offset from a center of the cover plate.

* * * * *